(12) United States Patent
Kadijk et al.

(10) Patent No.: US 8,174,488 B2
(45) Date of Patent: May 8, 2012

(54) VISUAL DISPLAY SYSTEM WITH VARYING ILLUMINATION

(75) Inventors: Simon Eme Kadijk, Eindhoven (NL); Gwendolyn Anita Luiten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 345 days.

(21) Appl. No.: 12/517,579

(22) PCT Filed: Dec. 7, 2007

(86) PCT No.: PCT/IB2007/054970
§ 371 (c)(1),
(2), (4) Date: Jun. 4, 2009

(87) PCT Pub. No.: WO2008/072152
PCT Pub. Date: Jun. 19, 2008

(65) Prior Publication Data
US 2010/0020251 A1   Jan. 28, 2010

(30) Foreign Application Priority Data

Dec. 11, 2006  (EP) .................................... 06125846

(51) Int. Cl.
*G09G 3/34* (2006.01)
(52) U.S. Cl. ......... 345/102; 345/207; 348/843; 348/844
(58) Field of Classification Search .......... 348/836–842; 345/102, 207
See application file for complete search history.

(56) References Cited

U.S. PATENT DOCUMENTS

| | | | |
|---|---|---|---|
| 5,194,008 A * | 3/1993 | Mohan et al. ................... 434/22 |
| 6,064,423 A * | 5/2000 | Geng ............................... 348/36 |
| 6,577,080 B2 | 6/2003 | Lys et al. |
| 6,791,527 B2 * | 9/2004 | Yoshinaga et al. ............ 345/102 |
| 6,801,003 B2 | 10/2004 | Schanberger et al. |
| 6,933,680 B2 | 8/2005 | Oskorep et al. |
| 7,014,336 B1 | 3/2006 | Ducharme et al. |
| 7,139,617 B1 | 11/2006 | Morgan et al. |
| 2001/0003464 A1 * | 6/2001 | Niikawa ........................ 348/341 |
| 2004/0061668 A1 | 4/2004 | Lin |
| 2005/0270265 A1 * | 12/2005 | Plut ................................ 345/102 |
| 2006/0198142 A1 | 9/2006 | Dickie |
| 2006/0203136 A1 | 9/2006 | Testin et al. |
| 2007/0097066 A1 * | 5/2007 | Ward ............................ 345/102 |
| 2008/0036728 A1 * | 2/2008 | Takagi et al. ................. 345/102 |
| 2009/0122087 A1 * | 5/2009 | Maruyama et al. ........... 345/690 |
| 2010/0005294 A1 * | 1/2010 | Kostiainen et al. ........... 713/168 |
| 2010/0053051 A1 * | 3/2010 | Nitanda ......................... 345/89 |

FOREIGN PATENT DOCUMENTS

| | | |
|---|---|---|
| EP | 1551178 A1 | 7/2005 |
| FR | 2769159 A3 | 4/1999 |
| WO | 0199475 A1 | 12/2001 |
| WO | 2007036890 A2 | 4/2007 |

* cited by examiner

*Primary Examiner* — William Gilbert
*Assistant Examiner* — Alp Akbasli

(57) ABSTRACT

A visual display system for use in conjunction with a display device includes one or more illumination sources for illuminating a region surround the image display region; and a control unit configured to control the illumination sources to vary the illumination in an inactive state of the display device. The control unit is further configured to synchronize the varying illumination with a color scheme.

11 Claims, 3 Drawing Sheets

VISUAL DISPLAY SYSTEM WITH VARYING ILLUMINATION

FIELD OF THE INVENTION

The invention relates to a visual display system, and in particular to a visual display system comprising one or more illumination sources. Moreover the invention relates to a method of operating a visual display system.

BACKGROUND OF THE INVENTION

Visual display devices are well known and include cinematic film projectors, television sets, monitors, plasma displays, liquid crystal display (LCD) televisions, and projectors etc. Such devices are often employed to present images or image sequences to a viewer. In the 1960s, backlighting was introduced due to the fact that televisions required a "darker" room for optimal viewing. Backlighting is in its simplest form white light, emitted from e.g. a light bulb, projected on a surface behind the visual display device. Backlighting has been suggested to be used to relax the iris and reduce eye strain. During recent years the backlighting technology has become more sophisticated and there are several display devices on the market with integrated backlighting features that enables emitting colors with different brightness depending on the visual information presented on the display device. The benefits of backlighting in general includes: a deeper and more immersive viewing experience, improved color, contrast and detail for best picture quality, and reduced eye strain for more relaxed viewing.

EP 1551 178 A1 discloses a supplementary visual display system for use in conjunction with a display device including an image display region for presenting images to a viewer. The display system comprises one or more illumination sources that at least partially peripherally surround the image display region. This system, and other systems of the prior art, are developed for operating the supplementary visual display system in an active mode, i.e. when images are presented on the screen of the display device.

The inventors of the present invention have appreciated that an improved visual display system which may be used in an off-state of the display device would be of benefit, and have in consequence devised the present invention.

SUMMARY OF THE INVENTION

The inventors have had the insight that a visual display system including one or more illumination sources for backlighting may advantageously be used also in an inactive state of the display device. Preferably, the invention alleviates, mitigates or eliminates one or more of the above or other disadvantages singly or in any combination.

According to a first aspect of the present invention there is provided, a visual display system for use in conjunction with a display device including an image display region, the display device having an active state and an inactive state, the system comprising:

one or more illumination sources disposed in a configuration so that illumination radiated therefrom illuminates an illumination region visually appearing to the viewer to at least partly peripherally surround the image display region; and a control unit configured to control the one or more illumination sources to vary the illumination of the illumination region in an inactive state of the display device, the control unit further being configured to synchronize the varying illumination of the illumination region with a color scheme.

Passive backlighting is an option that enables room lighting without having the display device switch on, i.e. in an active state. Typically, passive backlighting provides a static low-brightness lighting of a wall or screen behind the display device, such as a TV-set. However, small color differences may be present due to degradation of the light sources, especially with LEDs, such that passive backlighting with a smooth an even lighting effect may therefore be difficult to achieve.

The invention according to the first aspect is particularly but not exclusively advantageous for proving a system which enables backlighting in an inactive state of the display device where light source degradation and the resulting uneven lighting from different light sources is not a problem, since by driving the light sources to provide varying illumination, any degradation and resulting color shifts are not visible.

Moreover, a varying illumination may provide a comfortable low-brightness room lighting as well as interesting lighting of a room. Embodiments of the present invention may therefore add functionality to a display device, such as a TV-set, so that an owner of a display system in accordance with the present invention, in addition to own a display device also receives a lively and attractive light source for advanced room lighting.

In embodiments of the invention, the light sources are operated based on inputs from a color scheme. Advantageous embodiments of how to access and generate such a color scheme are defined in dependent claims.

In embodiments of the invention, may the visual display system further include a light-sensitive sensor and/or an input port for providing a versatile system capable of receiving instructions, such as a modulation signal or color schemes from external sources, i.e. sources external to the visual display system.

In a second aspect of the present invention there is provided a method of operating a visual display system, the visual display system comprises:

a display device including an image display region, the display device having an active state and an inactive state;

one or more illumination sources disposed in a configuration so that illumination radiated therefrom illuminates an illumination region visually appearing to the viewer to at least partly peripherally surround the image display region; and a control unit configured to control the one or more illumination sources, wherein the visual display system is operated by operating the control unit to generate a varying illumination of the illumination region in an inactive state of the display device, and wherein the varying illumination of the illumination region is synchronized with a color scheme.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
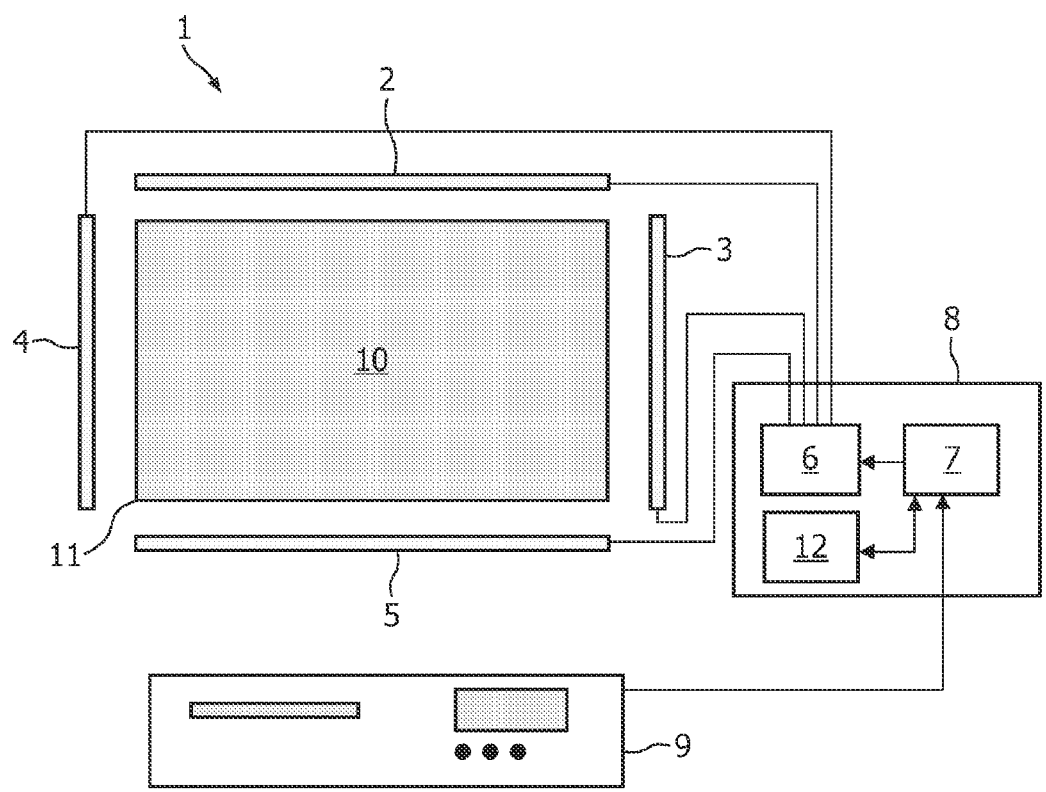
FIG. 1 illustrates an embodiment of a visual display system.

FIG. 1. illustrates an embodiment of a visual display system 1 in accordance with the present invention. The Figure shows a TV-set equipped with a backlighting system 2-5. As an example may the visual display system be a flat-screen TV 3 with Ambilight™ backlighting, as sold by Philips. In the following, the focus is on embodiments of a visual display system in the form of a TV-set with an at least partly peripheral backlighting system, however the invention is not limited to such a system, instead may embodiments of the invention be used in any type of visual display system employing backlighting.

FIG. 1 illustrates a visual display system 1 for use in conjunction with a display device 11 having an image display region 10, i.e. the TV-screen. One or more illumination sources 2-5 are disposed in a configuration so that illumination radiated therefrom, illuminates an illumination region visually appearing to the viewer to at least partly peripherally surround the image display region. In the shown embodiment, four light sources are present, a top light source 2, a bottom light source 5 and two side light sources, i.e. a right light source 3 and a left light source 4. Other configurations of the light sources include, but are not limited to, three light sources with a top and the side light sources 2-4, and two light sources being the side light sources 3, 4. In a typically situation, the illumination region is a wall or screen behind the TV-set, the wall or screen being illuminated by the light sources. The display device is having an active state, i.e. an on-state and an inactive state, i.e. a stand-by or off-state. The visual display system comprises a control unit 6 for controlling the light sources. Moreover, a data processor unit 7 may be present for proving an input signal to the control unit. The data processor unit may be connected to memory 12 for storing or retrieving data. The control unit 6, the data processor unit 7, the memory 12, and possible other units may be part the electronic elements 8 of the TV-set. Such elements are typically placed in the housing of the TV-set, behind the TV-screen or image display region 10. Moreover, the TV-set may connected to one or more auxiliary equipments 9, such as a DVD-player, a Blu-Ray player, a game console, a hard recorder, a disk, etc.

The light sources 2-5 may in different embodiments be different types of sources, the light sources may e.g. be cold cathode fluorescence lamps (CCFL) or light emitting diodes (LED), but a not limited to such light sources. For light sources of CCFL type, the control unit would comprise a lamp driver including a lamp inverter for operating the CCFL sources, whereas for light sources comprising LEDs, the control unit would comprise a lamp driver for operating the LED sources. Other embodiments of light sources are discussed in connection with FIG. 4.

Figure 2:
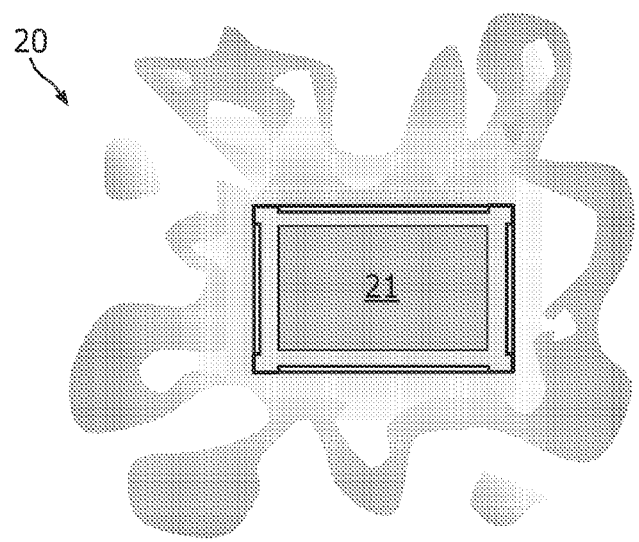
FIG. 2 illustrates an example of a varying illumination peripherally surrounding a wall mounted flat screen TV set.

The control unit is configured to control a varying illumination of the illumination region in an inactive state of the display device. The varying illumination is synchronized or generated based on a color scheme. Thus, in an inactive state of the display device, may the light sources be driven so that the area at least partly surrounding the display device is illuminated by a varying illumination, an illumination effect along the lines of a lava-lamp may thereby be generated. An example of a varying illumination 20 peripherally surrounding a wall mounted flat screen TV set 21 is provided in FIG. 2. FIG. 2 is merely provided as an illustrative example of a pattern of a varying illumination. The achievable types of pattern is not limited to the one shown, instead a large variety of patterns are attainable by the present invention.

The varying illumination is driven based on a color scheme. A color scheme is a prescription of the time evolution of the colors and intensity of the light, for each of the light sources. The color scheme is in a typical embodiment in the form of a data file that is processed by the data processor in the TV set.

The color scheme may prescribe a finite duration of the varying illumination of the illumination region, a repeated or endless loop of varying illumination may be obtained by configuring the control unit to repeat the color scheme in a loop.

The memory may store one or more pre-installed color schemes for selective or automatic selection. A user of the TV-set may e.g. use of a remote control set the operation of mode of the light sources. However, not pre-installed color schemes may also be provided in addition to or instead of pre-installed color schemes.

In an embodiment, may the color scheme be generated based on image data, such as a film shown on the TV-screen, a game played and viewed on the TV-screen, when the display device is in an active state. The color scheme may be generated by extracting colors and/or intensities from the image data. A user may e.g. request generation of a color scheme from a specific sequence of image data, or the display system may be set to automatically generate a color scheme from a viewed sequence of image data. The generated color schemes may then be used for varying illumination in an inactive state of the display device.

Figure 3:
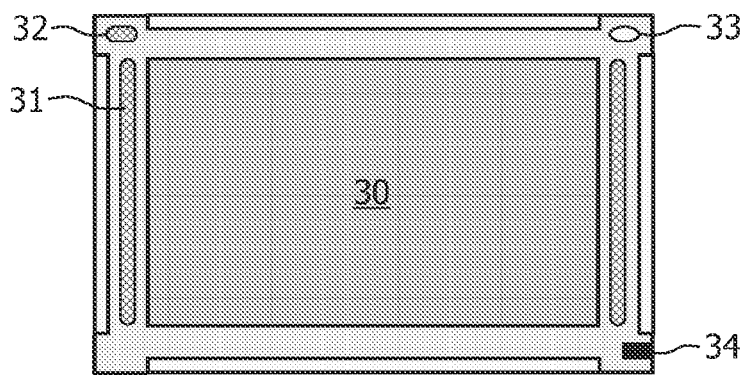
FIG. 3 illustrates a display system comprising loud speakers, a microphone and a light-sensitive sensor.

FIG. 3 illustrates a display system in accordance with embodiments of the present invention, the display system comprising loud speakers 31, a microphone 32 and a light-sensitive sensor 33.

In an embodiment, may the color scheme be generated based on audio data accompanying image data shown on the display device in an active state of the display device. The audio data may be presented to a viewer by loudspeakers present in the housing of the display device 30. In such embodiments, may the color scheme be generated by extracting audio parameters or audio features from the audio data. The audio parameters may be extracted directly from the audio data file, e.g. from the audio data of an MPEG movie or other types of audio data directly inputted into the processor unit. Alternatively may the audio parameters be extracted by receiving on a microphone 32 the presented audio data, the audio signal from the microphone 32 being inputted into the processing unit for extracting the color scheme.

In an embodiment may the color scheme be generated based on audio data recorded from the surroundings of the system. The audio data may be received by a microphone 32 present in the housing of the TV-set, and the color scheme may be generated by extracting audio parameters from the received audio data. The audio of the surrounding may e.g. be music played at a separate music player. For example in connection with a party may the varying illumination be generated based on the played music, e.g. modulated by the pitch, beat, etc. of the played music.

In an embodiment may the visual display system comprise a light-sensitive sensor 33 for detecting the light level surrounding the display system. The intensity of the radiated illumination may be modulated by an intensity of the detected signal of the light-sensitive sensor. By reacting to the ambient light level, a mood intensifier may be provided, since in low ambient light situations, a dim or low intensive varying illumination may be provided, so that the overall intensity of the varying illumination reflects the ambient light level.

In an embodiment may the visual display system comprise a data input port 34 for inputting a color scheme into the system. The input port may e.g. be used for connecting to computer system storing a color scheme, which may be loaded into the memory of the TV-set. In embodiments may the TV-set include processing power sufficient for directly connecting the TV-set to the Internet, such a connection may be made through the input port, thereby rendering it possible to via the Internet to access color schemes directly from the TV-set.

A color scheme may e.g. be extracted from a sequence of image data, by for each image extract parameter representing intensities and colors, and translate, in the data processor, these parameter to operation parameters of the light source driver. For example, may the image screen be divided in a number of sub-regions, such as the intensity and overall color of a right section is extracted and projected to the right light source 3 and vice versa for the other light sources. The intensity modulation and color modulation over time may be extracted from the intensity modulation and color modulation of the sequence of the images.

Color schemes can be associated with certain moods. The color schemes may carry the associated mood as a label that can be recognized by the end consumer.

Examples include, but are not limited to the following list of moods and associated characterizing features:

| Mood: | Characterizing features: |
|---|---|
| Ocean waves | Blue-ish, varying in a more or less structured way |
| Sunrise & sunset | Yellow colors varying slowly to orange and back again, mixed with random effects |
| Forest | Green colors, randomly varying in intensity |
| Bubbles | All kind of colors, slowly and randomly varying |
| Living white | Nearly white pastel-like colors varying slowly |
| Disco | Bright colors running around the set (to be used for 4-sided or Pixelated backlighting (e.g. FIG. 4B)) |

Figure 4A:
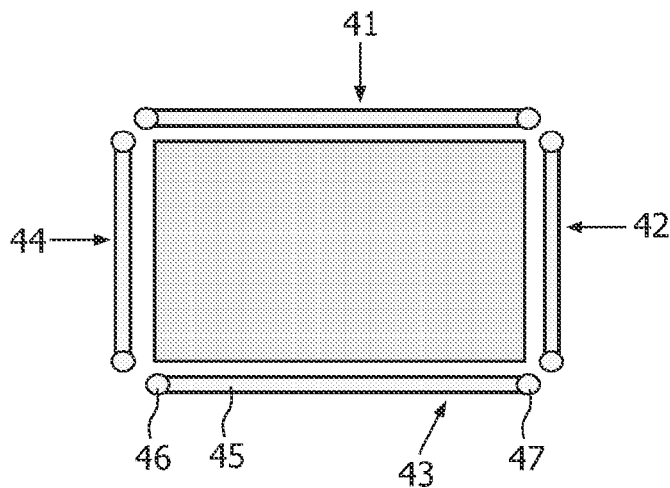
FIG. 4 schematically illustrates embodiment of light sources employing LEDs.

FIG. 4 schematically illustrates embodiment of light sources employing LEDs. In FIG. 4A each of the four light sources 41-44 comprises a light guide 45 and two LED units 46, 47 at each end of the light guide. Alternatively, a single LED unit, placed at either side or at a point along the light guide, may be used. The LED units 46, 47 may comprise three LEDs of the colors red, green and blue. By varying the input current to each LED a light spectrum of visible colors corresponding to the RGB standard may be presented.

Figure 4B:
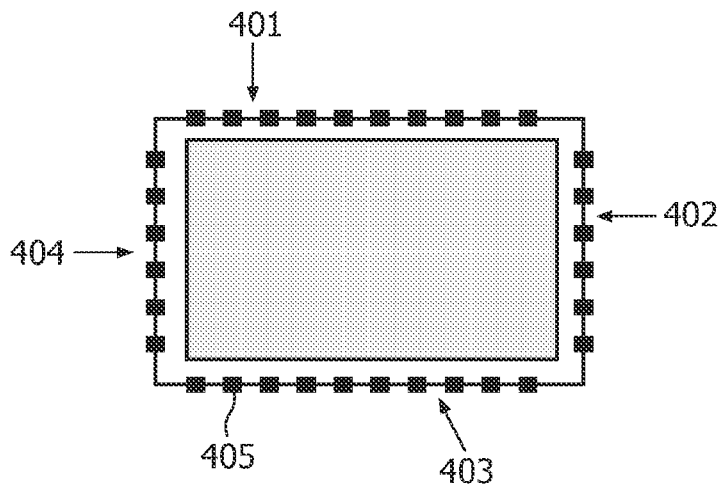

In FIG. 4B each of the four light sources 401-404 comprises a strip or column of LED units 405. Again may the LED units 405 comprise three LEDs of the colors red, green and blue. The LED units may be individually controlled or controlled in groups. In other embodiments instead of single strip, more rows of LED units may be applied, thereby enabling the generation of more advanced illumination patterns.

Light sources other than LEDs are equally possible within the scope of the invention. Hence, the use of the term LED in this context should be appreciated as a light emitting system that is capable of receiving an electric signal and producing a color of light in response to the signal, e.g. light emitting polymers, semiconductor dies that produce light in response to current, organic LEDs, electro-luminescent strips, silicon based structures that emit light, and other such systems. Also other types of light sources are possible, such as incandescent light sources, e.g. filament lamps, photo-luminescent sources e.g. gaseous discharge sources, fluorescent sources, phosphorescence sources, lasers, such as diode lasers, etc.

The varying illumination may in addition to driving the light sources of the display system from a color scheme, also include moving mirrors or other optical elements capable of further controlling the emitted light. Other examples include optical elements capable of adjusting the refractive index, the transparency or other parameters by applying a voltage across the element, thereby further modulating the emitted light by modulating the voltage across the element.

Figure 5:
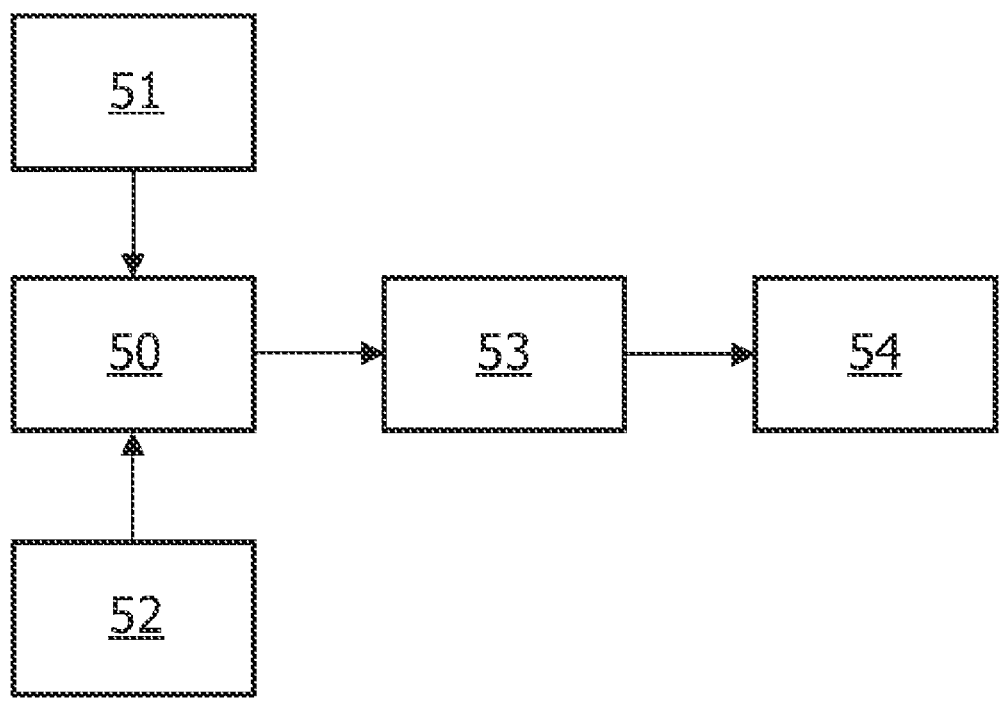
FIG. 5 illustrates a flow diagram of steps to be performed in embodiments of operating a visual display system.

FIG. 5 illustrates a flow diagram of steps to be performed in embodiments of operating a visual display system comprising a display device in an inactive state.

A color scheme 50 is received or accessed. The color scheme may in embodiments be received in its entirety 51, e.g. from a memory, accessed by a computer system or the Internet etc. Alternatively, may the color scheme be generated 52 by a data processor unit from inputs or parameters. For example for parameter extracted from image data or audio data, etc. The color scheme is accessed by a processor unit for translating 53 the data of the color scheme into control parameters of the light sources. Alternatively may the color scheme be represented by control parameters, and these control parameters are translated 53 into settings of the light sources. The control unit is next operated to drive 54 light sources so that a varying illumination of the illumination region is generated. The varying illumination of the illumination region is thereby synchronized to the color scheme.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A visual display system for use in conjunction with a display device including an image display region, the display device having an active state and an inactive state, the system comprising:

one or more illumination sources disposed in a configuration so that illumination radiated therefrom illuminates an illumination region visually appearing to the viewer to at least partly peripherally surround the image display region; and a control unit configured to control the one or more illumination sources to vary the illumination of the illumination region in an inactive state of the display device when image data is not presented on the display region, the control unit further being configured to synchronize the varying illumination of the illumination region with a color scheme.

2. The visual display system according to claim 1, wherein the color scheme prescribes a finite duration of the varying illumination of the illumination region, and wherein the control unit is further configured to repeat the varying illumination by repeating the color scheme in a loop.

3. The visual display system according to claim 1, wherein one or more color schemes are pre-installed in a memory of the visual display system.

4. The visual display system according to claim 1, wherein the color scheme is generated based on the image data presented on the display region in an active state of the display device, the color scheme being generated by extracting colors and/or intensities from the image data.

5. The visual display system according to claim 1, wherein the color scheme is generated based on audio data accompanying image data presented on the display region in an active state of the display device, the color scheme being generated by extracting audio parameters from the audio data.

6. The visual display system according to claim 1, wherein the color scheme is generated based on audio data recorded from surroundings of the visual display system captured by a microphone of the visual display system, the color scheme being generated by extracting audio parameters from the audio data.

7. A visual display system for use in conjunction with a display device including an image display region, the display device having an active state and an inactive state, the system comprising:

one or more illumination sources disposed in a configuration so that illumination radiated therefrom illuminates an illumination region visually appearing to the viewer to at least partly peripherally surround the image display region;

a control unit configured to control the one or more illumination sources to vary the illumination of the illumination region in an inactive state of the display device, the control unit further being configured to synchronize the varying illumination of the illumination region with a color scheme; and a light-sensitive sensor for detecting a signal indicative of light of surroundings of the visual display system, wherein intensity of the radiated illumination is modulated by an intensity of the signal detected by the light-sensitive sensor.

8. The visual display system according to claim 1, further including a data input port for inputting a color scheme into the system.

9. A method of operating a visual display system, the method comprising the acts of:

providing one or more illumination sources disposed in a configuration so that illumination radiated therefrom illuminates an illumination region visually appearing to a viewer to at least partly peripherally surround an image display region of a display device having an active state and an inactive state; and controlling the one or more illumination sources to generate a varying illumination of the illumination region in the inactive state of the display device when image data is not presented on the display region, wherein the varying illumination of the illumination region is synchronized with a color scheme.

10. The method of claim 9, wherein intensity of the radiated illumination is modulated by an intensity of a signal detected by a light-sensitive sensor.

11. The method of claim 9, wherein the color scheme is generated based on audio data from surroundings of the visual display system captured by a microphone of the visual display system, the color scheme being generated by extracting audio parameters from the audio data.

\* \* \* \* \*